United States Patent
Englund et al.

(10) Patent No.: US 11,148,090 B2
(45) Date of Patent: Oct. 19, 2021

(54) POCKET FILTER ASSEMBLY

(71) Applicant: Camfil AB, Stockholm (SE)

(72) Inventors: Fredrik Englund, Vagnhärad (SE);
Stefan Ericson, Vagnhärad (SE)

(73) Assignee: Camfil AB, Stockholm (SE)

( * ) Notice: Subject to any disclaimer, the term of this patent is extended or adjusted under 35 U.S.C. 154(b) by 242 days.

(21) Appl. No.: 16/310,735

(22) PCT Filed: Jun. 26, 2017

(86) PCT No.: PCT/SE2017/050701
§ 371 (c)(1),
(2) Date: Dec. 17, 2018

(87) PCT Pub. No.: WO2018/004431
PCT Pub. Date: Jan. 4, 2018

(65) Prior Publication Data
US 2019/0321768 A1    Oct. 24, 2019

(30) Foreign Application Priority Data

Jun. 29, 2016    (SE) .................................... 1650939-0

(51) Int. Cl.
*B01D 46/42* (2006.01)
*B01D 46/02* (2006.01)
*B01D 46/00* (2006.01)

(52) U.S. Cl.
CPC ....... *B01D 46/4227* (2013.01); *B01D 46/023* (2013.01)

(58) Field of Classification Search
CPC ................ B01D 46/008; B01D 46/023; B01D 46/0091; B01D 46/4227
See application file for complete search history.

(56) References Cited

U.S. PATENT DOCUMENTS

| | | | |
|---|---|---|---|
| 6,045,599 A | 4/2000 | Solberg, Jr. | |
| 2013/0031885 A1* | 2/2013 | Soderholm | B01D 46/023 55/497 |
| 2019/0321768 A1 | 10/2019 | Englund et al. | |

FOREIGN PATENT DOCUMENTS

| | | |
|---|---|---|
| CN | 1140627 A | 1/1997 |
| CN | 2480044 Y | 3/2002 |
| CN | 102858424 A | 1/2013 |
| CN | 104107011 A | 10/2014 |
| CN | 104136092 A | 11/2014 |
| CN | 207371256 U | 5/2018 |

(Continued)

OTHER PUBLICATIONS

Chinese Office Action and Search Report Application No. 201710511538.2 dated Aug. 5, 2020.

(Continued)

*Primary Examiner* — Lucas A Stelling
*Assistant Examiner* — Hafiz Muhammad Aamir
(74) *Attorney, Agent, or Firm* — Patterson + Sheridan, LLP

(57) ABSTRACT

A pocket filter assembly with reduced risk for exposing a user to contaminations leaving the pocket filter assembly during and after removal of the pocket filter assembly from an installation is disclosed. A first pocket filter comprises a grip member configured to be gripped by the user to enable folding of the pocket filters in a controlled manner before removal of the pocket filter assembly from an installation.

14 Claims, 3 Drawing Sheets

(56) References Cited

FOREIGN PATENT DOCUMENTS

| | | |
|---|---|---|
| DE | 1782154 B1 | 1/1972 |
| DE | 7510986 U | 10/1975 |
| DE | 7703858 U1 | 5/1977 |
| DE | 4004343 A1 | 8/1991 |
| EP | 3478392 A1 | 5/2019 |
| JP | S6099322 A | 6/1985 |
| JP | H11319446 A | 11/1999 |
| JP | 2011230107 A | 11/2011 |
| WO | 2006126937 A1 | 11/2006 |
| WO | 2010149228 A1 | 12/2010 |
| WO | 2018004431 A1 | 1/2018 |

OTHER PUBLICATIONS

Search Report from Canadian Application No. 3,028,942 dated Jan. 31, 2020.
Search Report European Patent Application No. 17820649.6 dated Jan. 27, 2020.
International Search Report and Written Opinion from PCT/SE2017/050701 dated Sep. 7, 2017.
Search Report from Swedish Application No. 1650939-0 dated Jan. 26, 2017.
Office Action for European Patent Application No. 17820649.6 dated Nov. 23, 2020.

\* cited by examiner

POCKET FILTER ASSEMBLY

CROSS-REFERENCE TO RELATED APPLICATIONS

This application claims benefit of PCT Application Ser. No. PCT/SE2017/050701, filed Jun. 26, 2017, and Swedish Application SE 1650939-0, filed on Jun. 29, 2016, both of which are incorporated by reference in their entirety

TECHNICAL FIELD

The present invention relates to a pocket filter assembly for removing contaminants from an air or gas flow, the pocket filter assembly comprising a frame structure having a number of pocket filter openings, and a corresponding number of filter pockets.

BACKGROUND

Pocket filter assemblies are used for removing contaminants, such as particles or gaseous contaminations, from an air or gas flow. A pocket filter assembly comprises a frame structure which may be rectangular or square shaped. The frame structure comprises a number of parallel elongated filter pocket openings extending in a first direction of the frame structure, and a corresponding number of separate filter pockets (sometimes also referred to as filter bags). Each filter pocket has a pocket mouth sealingly secured in a corresponding filter pocket opening and extends out of the frame structure at one side thereof such that a bottom end of the pocket filter is substantially parallel with the frame structure. During operation, the air or gas flow to be filtered is passed through the filter pocket assembly by entering the mouths of the plurality of pocket filters and passing the filter walls of the pocket filters, whereby particles or gaseous contaminations in the air or gas flow are trapped by the filter medium of the filter walls. Thus, the pocket filter assembly comprises a so called dirty side where the air or gas flow enters the pocket filter assembly and a so called clean side where the filtered air or gas flow exits the pocket filter assembly. The pocket filter assembly is installed in an installation, such as a filtration assembly, ventilation housing or a filter cabinet, by mounting the frame structure of the pocket filter assembly to a mating structure inside the installation.

EP 1 883 464 B1 discloses one example of a pocket filter assembly comprising a frame structure having a number of filter pocket openings and a corresponding number of filter pockets, each filter pocket having a pocket mouth sealingly secured in a corresponding filter pocket opening. Additional examples of pocket filter assemblies may be found in JP 2011-230107 A; WO 99/37384 A1 and U.S. D692,543 S.

When a pocket filter assembly is to be removed from an installation after use in order to be replaced with a new pocket filter assembly, the user releases the pocket filter assembly from the mating structure of the installation. The pocket filter assembly is thereafter lifted out of, or drawn out of, the mating structure and removed from the installation. In doing so, the user may risk being exposed to contaminations such as particles coming out of the used filter. While it is often intended that the user should put the used pocket filter assembly into a plastic bag or the like immediately after removal of the used pocket filter, it has been found that it sometimes may be difficult to do immediately after removal. For example, in some instances a pocket filter assembly may be installed in an installation such that the user may need to climb on a ladder or the like and thus does not necessarily have both hands free, and therefore only puts the used pocket filter in the plastic bag once he/she is on the ground again.

SUMMARY OF THE INVENTION

The object of the present invention is to provide a pocket filter assembly which may be removed from an installation with a reduced risk of the user being exposed to contaminations contained in and possibly released from the pocket filters of the pocket filter assembly.

The object is achieved by means of the pocket filter assembly as defined in the appended claims.

The pocket filter assembly is configured so as to enable the user to easily fold the filter pockets of the pocket filter assembly before the pocket filter assembly is released and removed from the mating structure of an installation. More specifically, the user may easily fold the pocket filters from a clean side of the pocket filter assembly before removing the pocket filter assembly from the installation. When the filter pockets are in a folded state towards the frame structure of the pocket filter assembly, there is a considerably lower risk for contaminations being released from the pocket filters when the pocket filter assembly is lifted out of, or drawn out of, the mating structure of an installation for removal of the pocket filter assembly. In order to facilitate the filter pockets to be folded towards the frame structure, the innermost filter pocket, i.e. the filter pocket furthest from the user when he is to remove the pocket filter assembly from the installation, comprises a grip member which is configured so as to enable the user to easily grip the grip member and pull the filter pocket comprising the grip member towards him, thereby effectively folding and holding the folded filter pockets against the frame structure such that the pocket filter assembly is in a substantially flat state.

The pocket filter assembly for removing contaminations from an air or gas flow comprises a frame structure comprising four peripheral frame portions and having a number of filter pocket openings.

The pocket filter assembly further comprises a number of filter pockets corresponding to the number of filter pocket openings. Each pocket filter comprises a mouth, a bottom end and a filter wall connecting the bottom end to the mouth. The mouth of each filter pocket is sealingly secured to a corresponding filter pocket opening of the frame structure. A first filter pocket of the number of filter pockets, arranged closest to a first peripheral frame portion of the frame structure, comprises a grip member integrally formed with or in, or attached to, the filter wall and/or the bottom end of the first filter pocket.

The bottom end of each filter pocket may suitably extend longitudinally in a direction substantially perpendicular to the direction of flow through the pocket filter assembly during use, and comprises a first longitudinal end and an opposing second longitudinal end. The grip member may suitably be arranged such that it is distanced from the first and second longitudinal ends of the bottom end portion, for example substantially midway between the first and the second longitudinal ends of the bottom end.

The grip member may constitute a strip or a string comprising a first end and a second end, wherein at least the first end of said strip or string is attached to the filter wall and/or the bottom end of the first filter pocket. Such a strip or string can easily be sawn, glued, welded or otherwise attached to the filter wall or bottom end of the pocket filter without substantially influencing the ability of air or gas to flow through the filter wall during operation of the pocket filter assembly and without causing any risk for unintentional leakage of air or gas through the filter wall without filtration, caused for example by breakage of the filter wall.

Optionally, the second end of said strip or string may be attached to the filter wall and/or the bottom end of the first filter pocket. Thereby, the strip or string may form a loop, or a bowed or curved shape, to enable the string or strip to be easily gripped by the user substantially midway along the longitudinal extension of the strip or string.

The strip or string may comprise a first fastener or adhesive configured to enable fastening of the strip or string with the frame structure and/or a second fastener attached to the frame structure. Thereby, the strip or string can be fastened to the frame structure such as to hold the pocket filters in a folded state without relying on a firm grip of the user between the filter pockets and the frame structure when the pocket filter assembly is removed from the installation. Alternatively, or in addition, the pocket filter assembly may comprise a tape or the like, comprising a suitable adhesive, attached to the third peripheral frame portion of the pocket filter assembly and configured to enable attachment thereof to the first pocket filter when the pocket filters have been folded.

It is naturally also possible to utilise a separate tape comprising adhesive, said separate tape not forming a part of the pocket filter assembly during operation thereof, to secure the first filter pocket to the third peripheral frame portion of the frame assembly when the pocket filters have been folded. Alternatively, for example a rubber band or the like, arranged such as to circumscribe the pocket filter assembly, may be used for the same purpose.

The pocket filter assembly may suitably comprise a handle integrally formed with or attached to the frame structure at or in the vicinity of a third peripheral frame portion of the frame structure, said third peripheral frame portion arranged substantially parallel with the first peripheral frame portion of the frame structure. Thereby, the user need not grip the frame structure when removing the pocket filter assembly from the installation. This further minimises the risk of exposing the user to contaminations contained on the dirty side of the pocket filter assembly since the user need not grip the upstream dirty side of the frame structure. Furthermore, the handle may facilitate holding the grip member such that the pocket filters remain in a folded state during removal of the pocket filter assembly by the user firmly holding the grip member towards the handle.

The handle may optionally be made of a flexible material. Thereby, inter alia the risk of the handle causing damage to the filter wall of the first filter pocket during operation of the pocket filter assembly is reduced.

The frame structure comprises an upstream side and a downstream side as seen in the direction of air or gas flow through the pocket filter assembly. The above mentioned handle may suitably extend from the downstream side of the frame structure in a direction substantially parallel with the direction of air or gas flow through the assembly. Thereby, the handle does not affect the ability of the frame structure to be mounted in a mating structure of the installation. Furthermore, arranging the handle on the downstream side of the frame structure ensures that the handle may be gripped by the user from the clean side of the pocket filter assembly before the pocket filter assembly is removed from the installation.

The handle is suitably configured to be bendable in a direction away from the pocket filter of the assembly towards the third peripheral portion of the frame structure.

Thereby, the user can easily carry the used pocket filter assembly with one hand since the frame structure of the pocket filter assembly can be held vertically while holding the handle.

The handle may suitably comprise at least one feature configured to enable fastening or hooking the grip member to said handle. Thereby, the pocket filters may be maintained in the folded state during removal of the pocket filter assembly from the installation and during carrying the used pocket filter assembly, without relying on the manual grip of the user or use of separate means for securing the pocket filters in a folded state to the frame structure, such as an adhesive tape or the like. In the case of the handle comprising at least one feature configured to enable fastening or hooking the grip member to said handle, the grip member may suitably constitute a strip or string having a first end and a second end and at least the first end of said strip or string is attached to the filter wall and/or bottom end of the first filter pocket, and said feature configured to enable fastening or hooking the grip member to said handle comprises a recess or hole adapted for insertion of a part of said strip or string therein.

Alternatively, in the case of the handle comprising at least one feature configured to enable fastening or hooking the grip member to said handle, the grip member may suitably constitute a strip or string having a first and a second end, the first and second ends of the strip or string member each attached to the filter wall and/or bottom end of the first filter pocket such that the strip or string forms a loop, and said at least one feature configured to enable fastening or hooking of the grip member to said handle comprises at least one recess in a side surface of said handle and wherein said loop is configured to enable pulling the loop over said handle such that the loop extends across the handle on a side of the handle facing the third peripheral portion of the frame structure.

The grip member of the pocket filter assembly may suitably be made of an elastic material. Thereby, the size thereof can be reduced in comparison to a case of a substantially non-elastic material. Furthermore, the grip member thereby can be elastically stretched, for example for enabling pulling the grip member over a handle as discussed above, while fastening the grip member to a fastener of the frame structure or an optional handle.

DETAILED DESCRIPTION

The invention will be described below in more detail with reference to the accompanying drawings and certain exemplifying embodiments. The invention is however not limited to the exemplifying embodiments shown and discussed but may be varied within the scope of the appended claims. Moreover, the drawings shall not be considered drawn to scale as some features may be exaggerated in order to more clearly illustrate the features of the pocket filter assembly or the details thereof.

In the present disclosure, the term "flexible" should be considered to mean capable of being bent without breaking or otherwise cracking in response to a bending force, in particular a bending force applied by a human, and capable of returning to original shape after release of said bending force.

Furthermore, in the present disclosure, the term "elastic" should be considered to mean capable of being stretched in response to a stretching force, in particular by a stretching force applied by a human, and capable of returning to original shape after release of said stretching force.

Moreover, in the present disclosure, the wording "sealingly secured" shall be considered to mean that the feature to which it relates is secured in a manner such that no air or gas flow can escape between the feature to which it relates and a feature to which it is secured.

Furthermore, the term "direction of flow through the pocket filter assembly" or similar expressions is in the present disclosure intended to mean the general direction through the pocket filter assembly and therefore does not take into account the fact that the flow will alter direction when passing a filter wall of a pocket filter. In case of any unclarities, "direction of flow through the pocket filter assembly" or similar expressions shall be considered to mean the direction of flow through the frame structure of the pocket filter assembly from an upstream side to a downstream side. The downstream side of the frame structure is the side from which the pocket filters extend away from the frame structure.

Figure 1:
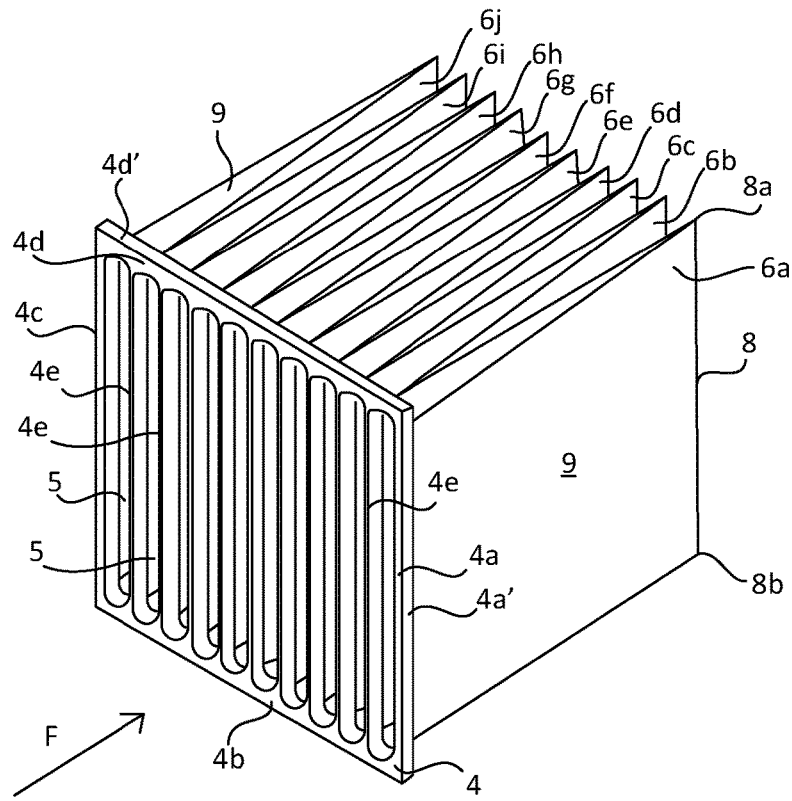
FIG. 1 illustrates a perspective view of a pocket filter assembly in accordance with prior art.

FIG. 1 illustrates a perspective view of a pocket filter assembly in accordance with prior art. The pocket filter assembly 1 comprises a frame structure 4 which suitably may be rectangular or square shaped. The frame structure comprises four peripheral frame portions 4a, 4b, 4c, 4d arranged such as to define the rectangular or square shape of the frame structure 4. The peripheral frame portions may be interconnected by rounded corners or chamfers if desired. Each peripheral frame portion comprises a peripheral side surface 4a', 4b', 4c', 4d' (only 4a' and 4d' visible in the figure) generally extending in a direction parallel to the direction of air or gas flow through pocket filter assembly and the frame structure thereof. The direction of flow through the pocket filter assembly is illustrated by the arrow F. The frame structure further comprises a number of parallel frame ribs 4e extending between two opposing peripheral frame portions 4b, 4d so as to define longitudinal filter pocket openings 5 in the pocket filter assembly. The respective longitudinal ends of the pocket filter openings 5 may suitably be rounded, as can be seen in the figure, while this is not necessary.

The pocket filter assembly further comprises a number of separate filter pockets 6a, 6b, 6c, 6d, 6e, 6f, 6g, 6h, 6i, 6j. Each filter pocket comprises an open mouth through which the air or gas to be filtered enters each filter pocket, at least one filter wall 9 through which the air or gas exits each filter pocket, and a closed bottom end 8. The bottom end suitably comprises a first longitudinal end 8a, such as a first corner, and an opposing second longitudinal end 8b, such as a second corner. It is however also plausible that the closed bottom end has a generally rounded shape even though this is less preferred in terms of maximising the filter media of each filter pocket. The filter pockets 6a-6j are sealingly arranged in the pocket filter assembly such that only one filter pocket is arranged in each filter pocket opening 5. More specifically, the mouth of each filter pocket is sealingly secured in a corresponding filter pocket opening 5 of the frame structure. This may for example be achieved by clamping the mouths of the filter pockets between co-operating portions of an outer and an inner subframe of the frame structure, by means of an adhesive and/or separate locking elements, or by any other means known in the art.

The filter pockets are permanently attached to the frame structure. Thus, when the pocket filter assembly is to be removed from an installation, such as a ventilation housing or the like, the whole pocket filter assembly including the frame structure and the filter pockets is removed from a mating structure in the installation in which the pocket filter assembly has been mounted during operation, and the whole pocket filter assembly is discarded.

In most installations, the air or gas flow through the pocket filter assembly is generally in a horizontal direction in which case the elongated mouth and the bottom end 8 of each filter pocket generally extend substantially vertically within the installation. It is however also plausible to use the pocket filter assembly in an installation wherein the air or gas flow through the filter assembly occurs in a substantially vertical direction. The frame structure of the pocket filter assembly is configured to be mounted in a mating structure of the installation, i.e. a mating structure of for example a filter cabinet or ventilation housing.

When a pocket filter assembly as disclosed above with reference to FIG. 1 is removed from a mating structure of an installation for enabling replacement of the used pocket filter assembly with a new pocket filter assembly, the user may risk being exposed to contaminations released from the filter pockets of the pocket filter assembly. The present invention solves the problem by enabling the filter pockets to be folded in a controlled manner towards the frame structure. This is achieved by providing the filter pocket arranged furthest from the user when the pocket filter assembly is to be removed from the installation with a grip member. The grip member is intended to be gripped by the user, and pulled towards the user and against the peripheral frame portion of the frame structure closest to the user. Thereby, the filter pockets will be folded towards the frame structure before removal of the pocket filter assembly, the user still operating from a clean side of the pocket filter assembly. With the filter pockets in a folded state when the pocket filter assembly is removed from the installation, the risk for exposing the user to contaminations is considerably reduced since much less contaminations may be released from the filter pockets into the surrounding environment.

Figure 2A:
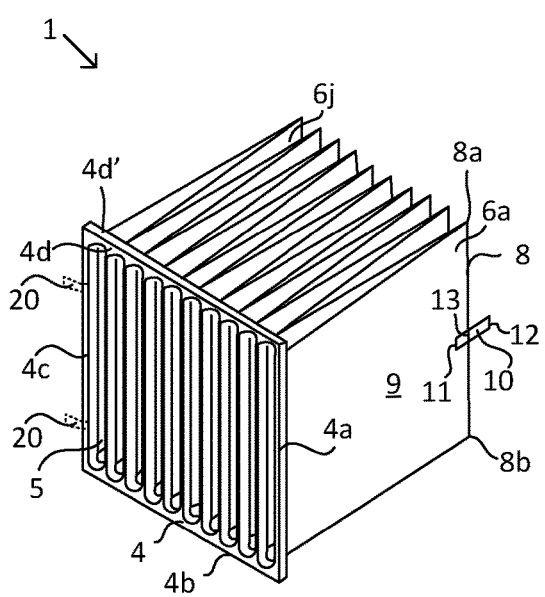
FIG. 2a illustrates a perspective view of a pocket filter assembly according to a first exemplifying embodiment of the present invention, as partly seen from the dirty side of the pocket filter assembly.
Figure 2B:
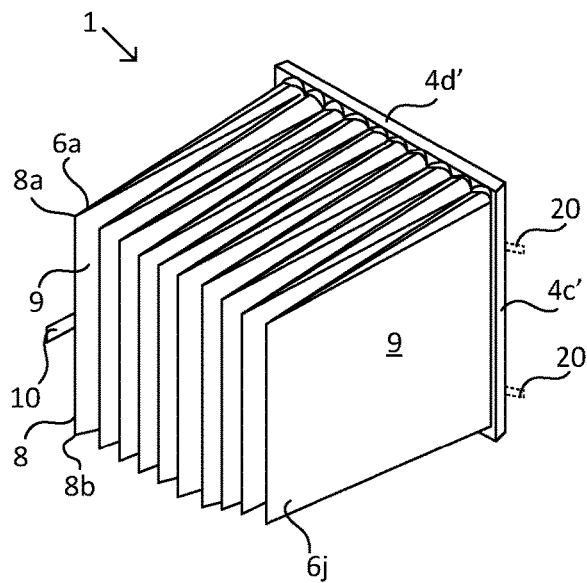
FIG. 2b illustrates a perspective view of the pocket filter assembly of FIG. 2a but seen from the clean side of the pocket filter assembly.

FIG. 2a illustrates a perspective view of a pocket filter assembly 1 according to a first exemplifying embodiment of the present invention, as partly seen from the dirty side of the pocket filter assembly. FIG. 2b illustrates a perspective view of the pocket filter assembly 1 of FIG. 2a, but seen from the clean side of the pocket filter assembly. The pocket filter assembly 1 according to the first exemplifying embodiment of the present invention differs from the pocket filter assembly shown in FIG. 1 in that a first filter pocket 6a comprises a grip member 10. The first filter pocket 6a is the filter pocket, out of the plurality of filter pockets, arranged closest to a first peripheral frame portion 4a of the frame structure 4. The first peripheral frame portion 4a is the peripheral frame portion arranged furthest from a user intending to remove the pocket filter assembly from the installation. In other words, the first peripheral frame portion is the peripheral frame portion arranged furthest from a door of the installation, said door configured for enabling replacement of pocket filter assemblies.

The grip member may be attached to the filter wall 9 of the first filter pocket and/or the bottom end 8 of the first filter pocket. In the exemplifying embodiment shown in FIGS. 2a and 2b, the grip member 10 constitutes a strip which is attached to the filter wall 9 at a first end 11 of said strip and the opposing second end 12 of the strip is free from attachment to the first filter pocket. The user may thus grip the strip at the second end 12 thereof. The strip may be attached to the filter wall 9 by any suitable means, for example by stitching, by adhesive, by welding or the like. The strip may further be attached to the pocket filter at the bottom end 8 of the filter pocket, for example by a stitched seam 13 as shown in FIG. 2a.

In accordance with the present invention, the grip member is preferably located such that it ensures that the filter pockets are folded as straight as possible towards the frame structure thereby avoiding crinkles or filter pockets extending diagonally peripherally outside of the frame structure on one side of the frame structure when in a folded state. In the exemplifying embodiment shown in FIGS. 2a and 2b, this is achieved by arranging the grip member in the form of a strip midway along the longitudinal extension of the bottom end 8 of the first filter pocket, i.e. at equal distances from the first end corner 8a and the second end corner 8b.

Furthermore, in accordance with the present invention, the grip member is preferably arranged closer to the bottom end of the first filter pocket, if not provided at the bottom end, than the mouth of the first filter pocket to ensure that it may be easily gripped by a user. Moreover, the grip member may suitably at least partly extend from the first filter pocket in the direction of flow through the pocket filter assembly such that it is easily visible to the user when the pocket filter assembly is mounted to the mating structure of the installation.

As shown in FIGS. 2a and 2b, the frame structure may if desired be provided with one or more additional fastening means 20 at the third peripheral frame portion 4c. Said additional fastening means being configured for holding the first filter pocket 6a against the frame structure with the other filter pockets 6b-6j interposed between the frame structure and the first filter pocket. The fastening means 20 shown in FIG. 2b consists of tape comprising an adhesive enabling the fastening of the tape to the filter wall of the first filter pocket 6a when folded towards the frame structure. Said additional fastening means may alternatively for example be a rubber band configured to be pulled around the frame structure with the folded filter pockets such as to hold filter pockets in a folded state, Velcro, a snap fastener or other types of mechanical fasteners. It is also plausible to use one or more separate fasteners, which do not constitute a part of the pocket filter assembly when in use, for securing the filter pockets in a folded state as disclosed above.

In all other aspects than the presence of the grip member 10 and the optional additional fastening means 20, the first exemplifying embodiment of the pocket filter assembly according to the present invention corresponds to the pocket filter assembly as shown in FIG. 1.

Figure 3:
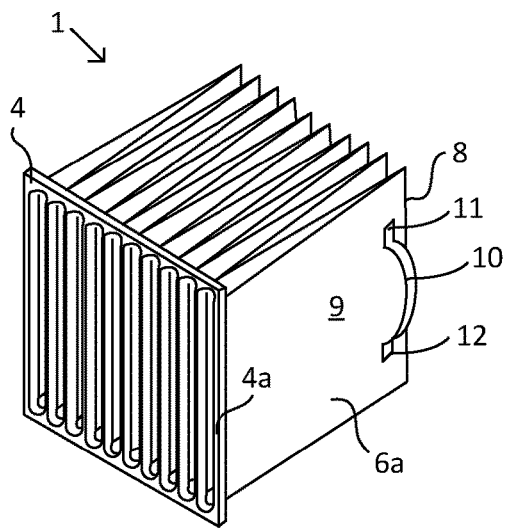
FIG. 3 illustrate a perspective view of a pocket filter assembly according to a second exemplifying embodiment of the present invention.

FIG. 3 illustrates a perspective view of a pocket filter assembly according to a second exemplifying embodiment. The second exemplifying embodiment differs from the first exemplifying embodiment of the pocket filter assembly according to the present invention in the configuration and location of the grip member 10. The grip member as shown in FIG. 3 constitutes a strip attached to the filter wall of the first filter pocket a distance from the bottom end 8. Both the first end 11 of the grip member and the second end 12 of the strip are attached to the filter wall such that the strip forms a bowed or curved shape which may be easily gripped by a user.

Figure 4:
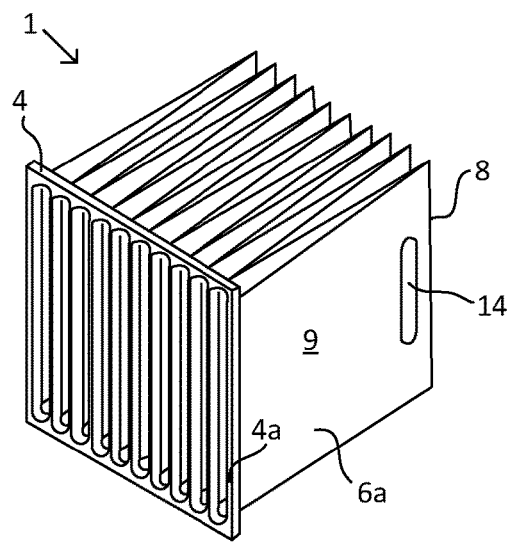
FIG. 4 illustrates a perspective view of a pocket filter assembly according to a third exemplifying embodiment of the present invention.

FIG. 4 illustrates a perspective view of a pocket filter assembly according to a third exemplifying embodiment which differs from the first and second exemplifying embodiments in that the grip member constitutes a grip member integrally formed in the filter wall of the first filter pocket. As shown in FIG. 4, the grip member consists of an elongated opening 14 in the filter wall. According to one possibility, the elongated opening 14 constitutes a through-opening in the first filter pocket and the edges of the through-opening are stitched or otherwise joined such as to ensure that no leakage of air or gas can occur through the elongated opening without being filtered. According to another possibility, an internal pocket is provided inside of the elongated opening 14 and the edge of the opening is stitched or otherwise joined to the internal pocket such as to ensure that no air or gas can escape through the elongated opening without being filtered.

Figure 5:
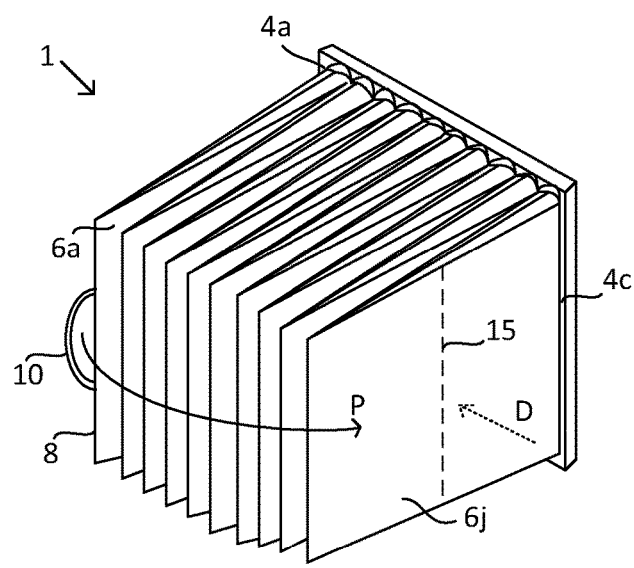
FIG. 5 illustrates a perspective view of a pocket filter assembly according to a fourth exemplifying embodiment.

FIG. 5 illustrates a perspective view of a pocket filter assembly according to a fourth exemplifying embodiment which differs from the exemplifying embodiment shown in FIG. 3 in that the grip member 10 constitutes a string which is attached to the bottom end 8 of the first filter pocket at the first end of the string as well as at the second end of the string such that the string forms a bowed or curved shape which can be easily gripped by the user.

FIG. 5 further illustrates how the filter pockets 6a-6j of the pocket filter assembly according to the present invention may be folded against the frame structure 4. Even though this is illustrated by reference to the fourth exemplifying embodiment, the filter pockets may be folded in the same manner irrespective of embodiment of the pocket filter assembly. Before the pocket filter assembly is removed from the mating structure to which it is mounted in an installation, such as a ventilation housing or a filter cabinet, the user can grip the grip member 10 by stretching his arm passed the filter pockets such that he reaches the filter pocket 6a arranged furthest from him. By pulling the grip member 10 towards him and further against the frame structure 4, as illustrated by arrow P, the filter pockets of the pocket filter assembly will be folded. If desired, the user can simultaneously slightly push the filter pocket 6j closest to him in the middle of the filter wall, as illustrated by the dotted arrow D, thereby initiating a crease 15 or the like, in order to facilitate the folding of the filter pockets as intended.

Figure 6:
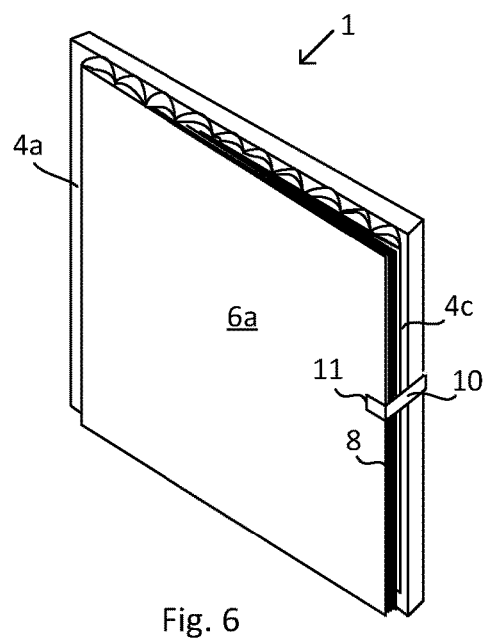
FIG. 6 illustrates a perspective view of a pocket filter assembly according to a fifth exemplifying embodiment, and when the pocket filters of the pocket filter assembly have been folded.

FIG. 6 illustrates a pocket filter assembly according to a fifth exemplifying embodiment and when the filter pockets of the pocket filter assembly are in a folded state. While the folded state is shown with regard to a specific exemplifying embodiment, it should be noted that the filter pockets may be folded in the same manner irrespective of the specific embodiment of the pocket filter assembly.

In accordance with the fifth exemplifying embodiment as illustrated in FIG. 6, the grip member constitutes a strip attached to the filter wall of the first filter pocket at a first end 11 of the strip in the same manner as described above with regard to the exemplifying embodiment illustrated in FIGS. 2a and 2b. However, in contrast to the first exemplifying embodiment of the pocket filter assembly according to the present invention as illustrated in FIGS. 2a and 2b, the strip comprises fastening means at the second end thereof, enabling the strip to be secured to the third peripheral frame portion when the filter pockets are in a folded state. The fastening means may for example be an adhesive at the second end of the strip. Alternatively, the fastening means may be a fastener such as Velcro, a snap fastener or another type of mechanical fastener, configured to cooperate with a corresponding fastener of, or attached to, the frame structure at the third peripheral frame portion 4c.

Figure 7:
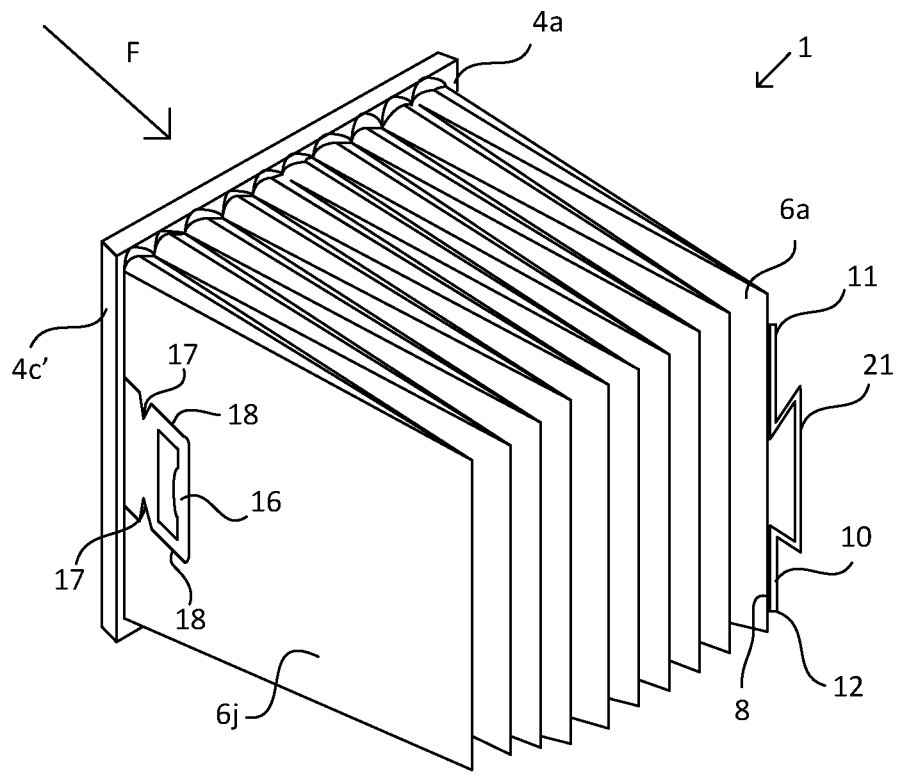
FIG. 7 illustrates a perspective view of a pocket filter assembly according to a sixth exemplifying embodiment of the present invention.

FIG. 7 illustrates a perspective view of a sixth exemplifying embodiment of a pocket filter assembly according to the present invention wherein the pocket filter assembly further comprises a handle attached to the frame structure. As shown in FIG. 7, the handle may be attached to the third peripheral frame portion 4c and extend from the downstream side of the frame structure 4 in a direction substantially parallel with the direction of air or gas flow, as illustrated by arrow F, through the pocket filter assembly during use. By arranging the handle such as to extend parallel to the direction of flow through the pocket filter assembly, it is ensured that it does not influence the ability of the pocket filter assembly to be mounted to a mating structure of an installation. Furthermore, it has the benefit that it provides a minimal risk for causing damage to the filter media of the filter pocket arranged closest to the handle during operation of the pocket filter assembly. It should be noted that the handle 16 need not be attached to the frame structure but may alternatively constitute an integral part of the frame structure without departing from the scope of the present invention.

The handle may optionally be configured to be bendable in a direction away from the filter pockets of the pocket filter assembly towards and against the third peripheral frame portion such that, when the handle is bended, it extends substantially perpendicular to the direction of flow though the pocket filter assembly during use. Thereby, the pocket filter assembly may for example be more easily carried by a user when the pocket filter assembly has been removed from an installation. This may for example be achieved by making the handle from a flexible material or by providing the handle with a hinge between a first portion of the handle attached to the frame structure and a second portion intended to be gripped by the user.

In the exemplifying embodiment shown in FIG. 7, the grip member 10 constitutes a string attached at both ends 11, 12 thereof to the bottom end of the first filter pocket. The string forms a loop 21 which may be pulled over the handle when the filter pockets 6a-6j are in a folded state against the frame structure 4. Thereby, the string extends across the handle 16 on a side of the handle parallel with the third peripheral side surface 4c' of the frame structure, which is the side of the handle which faces the user before removal of the pocket filter assembly from the installation. The string may suitably be secured to the handle 16 by means of recesses 17 arranged in side surfaces 18 of the handle, said recesses having a size suitable for holding the string in place in relation to the handle.

Figure 8:
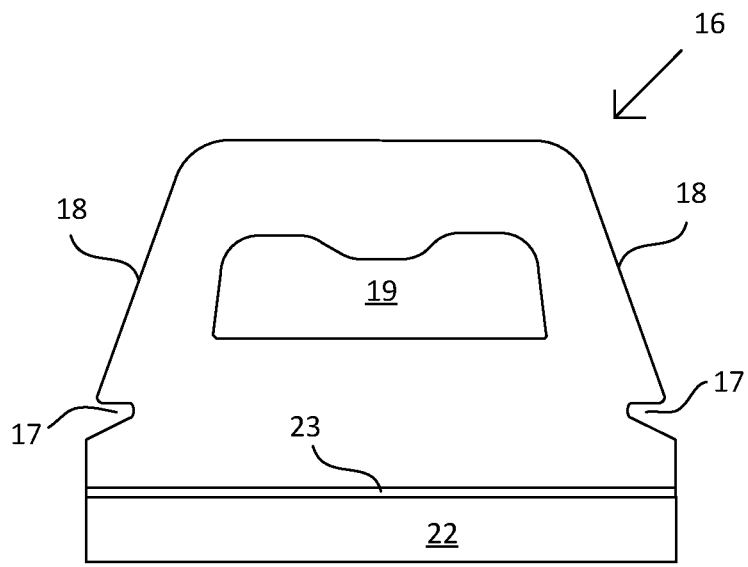
FIG. 8 illustrates a front view of a handle of a pocket filter assembly according to one exemplifying embodiment of the present invention.

FIG. 8 illustrates a front view of an exemplifying embodiment of a handle 16 suitable for the pocket filter assembly according to the present invention. The handle comprises an opening 19 configured to allow the user to introduce his hand and grip the handle. The handle further comprises a portion 22 adapted to be fastened, for example by an adhesive, welded or by one or more fasteners, to the frame portion. The handle 16 may optionally comprise a hinge 23, for example formed of a flexible material or constituting a crease, between the portion 22 and the opening 19.

Irrespective of the embodiment of the pocket filter assembly according to the present invention, the grip member 10 may suitably be made of an elastic material such that it can be slightly stretched when pulled by the user. This is especially beneficial in the case of the grip member being intended to be fastened or hooked to a corresponding feature of the frame structure or attached directly to the frame structure as this ensures that the pocket filters are sufficiently held against the frame structure when in folded state without allowing any movement of the pocket filters, as a result of the grip member being able to at least partly return to a non-stretched state.

Each filter pocket of the pocket filter assembly, irrespective of the exemplifying embodiment thereof, comprises a mouth, a filter wall 9 and closed bottom end 8. Each filter pocket may for example be formed of two filter wall elements joined at the ends thereof to each other so as to form a filter having an open mouth and a closed bottom end. Alternatively, each filter pocket may comprise a single filter wall element substantially double folded and joined in opposing ends, as well as in along one side of the double folded structure, such as to form a filter pocket having an open mouth and a closed bottom end. Each filter pocket is made from a filter media. Such filter mediums are previously known in the art and will therefore not be further discussed in the present disclosure. Furthermore, the filter pockets may be produced according to any conventional way known in the art. By way of example only, the filter pockets may be manufactured by sewing, welding or gluing the sides of the pockets while leaving one side open so as to form a mouth of the filter pocket. The specific configuration of each of the filter pockets and the material thereof are not limiting to the present invention, except where explicitly disclosed otherwise with regard to the filter pocket arranged closest to a first peripheral frame portion of the pocket filter assembly (i.e. the first filter pocket) as regards the grip member, and the pocket filter assembly may comprise a plurality of any previously known filter pocket as long as each one of the filter pockets comprises a mouth, a filter wall and a bottom end.

The pocket filter assembly according to the present invention is not limited to the exemplifying embodiments disclosed above and/or shown in the drawings. For example, the pocket filter assembly need not comprise ten filter pockets as shown in the figures, but may comprise any number of pocket filters as desired as long as it is a plurality of filter pockets. Suitably, the pocket filter assembly comprises between 3 and 20 filter pockets. Moreover, the frame structure may, while not shown in the figures, comprise one or more gaskets in accordance with prior art such as to enable the pocket filter assembly to be sealingly installed in filter installation.

Furthermore, it should be noted that the frame structure of the pocket filter assembly according to the present invention may for example consist of a single monolithic plate comprising the pocket filter openings 5. However, the frame structure may also comprise a number of subframes together defining the frame structure, for example as shown in EP 1 883 464 B1 or as shown in WO 99/37384 A1, without departing from the scope of the present invention. In fact, it is contemplated that any previously known frame structure comprising four peripheral frame portions and a plurality of pocket filter openings may be used in the pocket filter assembly according to the present invention. Suitably, the frame structure may comprise an outer subframe and a corresponding inner subframe positioned within the outer subframe, wherein the inner subframe is installed in the outer subframe from the downstream side of the pocket filter assembly, wherein each of the outer and inner subframes comprises openings for the filter pockets.

Moreover, it should be noted that the first filter pocket may comprise more than one grip member. For example, the first filter pocket may comprise a first grip member and a second grip member wherein the first and second grip members each are integrally formed with or in, or attached to, the filter wall and/or bottom end of the first filter pocket. The first and second grip members may for example be configured to be secured to a handle (the handle described above) in corresponding features of said handle configured to enable fastening or hooking the first and second grip member to said handle.

The invention claimed is:

1. A pocket filter assembly for removing contaminations from an air or gas flow, the assembly comprising:
   a frame structure comprising:
      four peripheral frame portions and having a number of filter pocket openings, the assembly further comprising:
         a number of filter pockets corresponding to the number of filter pocket openings, each filter pocket comprising:
            a mouth;
            a bottom end; and
            a filter wall connecting the bottom end to the mouth, wherein the mouth of each filter pocket is sealingly secured to a corresponding filter pocket opening of the frame structure, wherein a first filter pocket of the number of filter pockets, arranged closest to a first peripheral frame portion of the frame structure, comprises:
               a grip member integrally formed with or in, or attached to, the filter wall and/or the bottom end of the first filter pocket, said grip member being arranged substantially midway between a first longitudinal end and a second longitudinal end of the bottom end, and in that the pocket filter assembly is configured to enable a user to grip the grip member and pull the filter pocket comprising the grip member towards him, thereby folding and holding the folded filter pockets against the frame structure; and
         a handle integrally formed with or attached to the frame structure at or in a vicinity of a third peripheral frame portion of the frame structure, said third peripheral frame portion arranged substantially parallel with the first peripheral frame portion of the frame structure, wherein the handle is configured to be bendable in a direction away from the pocket filters of the assembly towards the third peripheral portion of the frame structure.

2. The pocket filter assembly according to claim 1, wherein said grip member constitutes a strip or string comprising:
   a first end; and
   a second end, wherein at least a first end of said strip or string is attached to the filter wall and/or the bottom end of the first filter pocket.

3. The pocket filter assembly according to claim 2, wherein the second end of said strip or sting is attached to the filter wall and/or the bottom end of the first filter pocket.

4. The pocket filter assembly according to claim 2, wherein said strip or string further comprises:
   a first fastener or adhesive configured to enable fastening of the strip or string to the frame structure and/or a second fastener attached to the frame structure.

5. The pocket filter assembly according to claim 1, wherein the handle is made of a flexible material.

6. The pocket filter assembly according to claim 1, wherein the frame structure comprises:
   an upstream side; and
   a downstream side as seen in a direction of air or gas flow through the pocket filter assembly and wherein the handle extends from the downstream side of the frame structure in a direction substantially parallel with the direction of air or gas flow through the assembly.

7. The pocket filter assembly according to claim 1, wherein the handle comprises at least one feature configured to enable fastening or hooking the grip member to said handle.

8. The pocket filter assembly according to claim 7, wherein the grip member comprises:
   a strip or string having a first end and a second end, at least the first end of said strip or string attached to the filter wall and/or the bottom end of the first filter pocket, and wherein said feature configured to enable fastening or hooking the grip member to said handle comprises a recess or hole adapted for insertion of a part of said strip or string therein.

9. The pocket filter assembly according to claim 7, wherein the grip member comprises:
   a strip or string having a first end and a second end, the first and second ends of the strip or string member each attached to the filter wall and/or the bottom end of the first filter pocket such that the strip or string forms a loop, said at least one feature configured to enable fastening or hooking of the grip member to said handle comprises at least one recess in a side surface of said handle and wherein said loop is configured to enable pulling the loop over said handle such that the loop extends across the handle on a side of the handle facing the third peripheral portion of the frame structure.

10. The pocket filter assembly according to claim 1, wherein the grip member is made of an elastic material.

11. A pocket filter assembly for removing contaminations from an air or gas flow, the assembly comprising:
    a frame structure comprising:
       four peripheral frame portions and having a number of filter pocket openings, the assembly further comprising:
          a number of filter pockets corresponding to the number of filter pocket openings, each filter pocket comprising:
             a mouth;
             a bottom end; and
             a filter wall connecting the bottom end to the mouth, wherein the mouth of each filter pocket is sealingly secured to a corresponding filter pocket opening of the frame structure, wherein a first filter pocket of the number of filter pockets, arranged closest to a first peripheral frame portion of the frame structure, comprises:

a grip member integrally formed with or in, or attached to, the filter wall and/or the bottom end of the first filter pocket;

the assembly further comprising:

a handle integrally formed with or attached to the frame structure at or in a vicinity of a third peripheral frame portion of the frame structure, said third peripheral frame portion arranged substantially parallel with the first peripheral frame portion of the frame structure, and wherein the frame structure comprises:

an upstream side; and a downstream side as seen in a direction of air or gas flow through the pocket filter assembly and wherein the handle extends from the downstream side of the frame structure in a direction substantially parallel with the direction of air or gas flow through the assembly; and wherein the handle is configured to be bendable in a direction away from the pocket filters of the assembly towards the third peripheral portion of the frame structure.

12. The pocket filter assembly according to claim 11, wherein the handle comprises at least one feature configured to enable fastening or hooking the grip member to said handle.

13. The pocket filter assembly according to claim 12, wherein the grip member comprises:

a strip or string having a first end and a second end, at least the first end of said strip or string attached to the filter wall and/or the bottom end of the first filter pocket, and wherein said feature configured to enable fastening or hooking the grip member to said handle comprises a recess or hole adapted for insertion of a part of said strip or string therein.

14. The pocket filter assembly according to claim 12, wherein the grip member comprises:

a strip or string having a first end and a second end, the first and second ends of the strip or string member each attached to the filter wall and/or the bottom end of the first filter pocket such that the strip or string forms a loop, said at least one feature configured to enable fastening or hooking of the grip member to said handle comprises at least one recess in a side surface of said handle and wherein said loop is configured to enable pulling the loop over said handle such that the loop extends across the handle on a side of the handle facing the third peripheral portion of the frame structure.

* * * * *